United States Patent [19]
Dwyer

[11] Patent Number: 5,337,053
[45] Date of Patent: Aug. 9, 1994

[54] METHOD AND APPARATUS FOR CLASSIFYING TARGETS

[75] Inventor: Roger F. Dwyer, Niantic, Conn.

[73] Assignee: The United States of America as represented by the Secretary of the Navy, Washington, D.C.

[21] Appl. No.: 147,238

[22] Filed: Oct. 22, 1993

[51] Int. Cl.$^5$ .................. G01S 7/292; G01S 15/00; G01S 7/52

[52] U.S. Cl. .................. 342/90; 342/22; 342/192; 342/194; 342/195; 367/99; 367/904

[58] Field of Search .................. 342/90, 22, 52, 192, 342/193, 195, 194; 367/99, 904

[56] References Cited

U.S. PATENT DOCUMENTS 4,980,868 12/1990 Teel .................. 367/904
5,091,890 2/1992 Dwyer .................. 367/99

*Primary Examiner*—John B. Sotomayor
*Attorney, Agent, or Firm*—Michael J. McGowan; Prithvi C. Lall; Michael F. Oglo

[57] ABSTRACT

A method and apparatus for classifying objects based upon information contained in the fourth order cumulant derived from energy from the object. Successive pulse returns in active systems and samples in passive systems are converted into vectors based upon the fourth order cumulant information for each successive return or sample. The vectors for each such pulse are compared to corresponding class information based upon the corresponding fourth order cumulant information. The comparison uses loglikelihood ratios of the different pairs of classes. Decision making is based upon the value of each loglikelihood ratio in comparison with a class threshold.

22 Claims, 6 Drawing Sheets

FIG.6

METHOD AND APPARATUS FOR CLASSIFYING TARGETS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to the classification of an object by means of energy received from the object and more specifically to a method and apparatus for classifying objects into physical categories on the basis of a Doppler spread signals received from the object.

(2) Description of the Prior Art

There are many applications where it is desirable to obtain, at one site, information about an object at a remote site. For example, radar systems at one site often obtain bearing, range, altitude and flight path information for aircraft. Sonar systems on submarines can provide bearing, range, depth and trajectory information related to another object in the water such as another submarine.

Prior art systems often transmit an energy pulse from one site toward the remote object as part of the process for obtaining information about the object. These energy pulses can take the form of acoustic pulses in sonar systems or electromagnetic pulses in radar systems. For purposes of this invention, the structure and operation of radar and sonar systems are closely analogous. The structure of one can readily be adapted to the other by persons of ordinary skill in the art. For brevity, the following discussion is limited to the application of this invention in sonar systems.

An active acoustic sonar system, basically, transmits one or a series of acoustic signals into the sea and extracts certain information about the target from the returned echo or echoes received between transmitted pulses. Passive sonar systems generally receive signals from the target itself. In either form, the received information often identifies many physical and operational characteristics of the target. The reliability of information obtained from sonar systems of either type depends to a large extent on the structure and motion of the target and the medium through which the energy passes, such as temperature, density, salinity and other sea water characteristics in the case of underwater sonar systems.

Often the ability of such systems to extract accurate range and Doppler information is degraded by a phenomena called Deppler spreading, which can be caused by the target and/or by the medium through which an acoustic, radar or other energy wave travels. Doppler spreading can occur as a result of the changing orientation of a target, the propeller on stern aspect targets, the interference from scattering from the target, fluctuations caused by the medium and physical effects caused by motion and vibration of the sonar system itself.

My U.S. Pat. No. 5,091,890 discloses a method for extracting target range and Doppler information from such Doppler spread signals by the use of a fourth order cumulant. In accordance with that disclosure, an active sonar system transmits a series of acoustic pulses into the medium where a target resides. In one specific embodiment, received reflected sonar echoes are matched with the transmitted pulses to determine the fourth order cumulant and the fourth order cumulant spectrum of the incoming information. Other methods can be used to derive the fourth order cumulant for the received information in passive sonar systems, radar systems and the like. The specifically disclosed system produces target range and Doppler information from which motion characteristics can be determined. This information is unaffected by Doppler spreading.

This particular system and other prior systems provide range and related information with differing degrees of accuracy. However, none of the systems disclose or suggest any apparatus by which such energy from a target can be used to classify a target into some physical category.

SUMMARY OF THE INVENTION

Therefore it is an object of this invention to provide a method and apparatus for classifying physical objects based upon energy received from the target.

Still another object of this invention is to provide a method and apparatus for classifying physical objects based upon energy from the target that is insensitive to random noise.

Still another object of this invention is to provide a method and apparatus for classifying physical targets based upon energy received from the target that is insensitive to random noise such as that caused by reverberation and clutter.

Yet still another object of this invention is to provide a method and apparatus for classifying physical targets based upon energy received from the target with improved accuracy.

In accordance with the method and apparatus of the present invention, energy from a target is converted into vectors based upon a fourth order cumulant function. Each of these vectors is compared with stored class information based upon the fourth order cumulants of each of a plurality of predetermined classes. During each comparison an attempt is made to classify the received signals into a class by virtue of comparing the reflected energy pulse vector.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 6 presents performance data for the apparatus shown in FIG. 2.

DESCRIPTION OF THE PREFERRED EMBODIMENT

Figure 1:
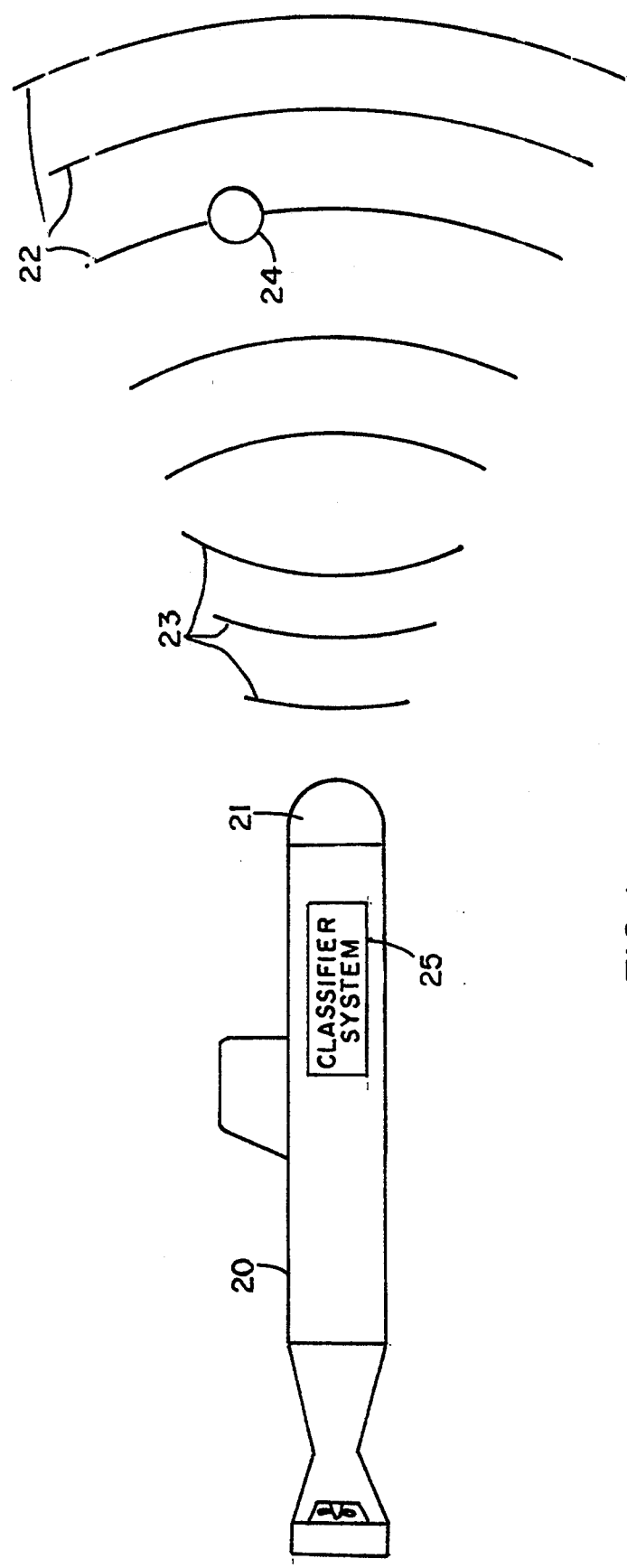
FIG. 1 is a diagrammatic view of a submarine transmitting acoustic pulses to and receiving sonar echoes from a submerged target according to the present invention.

In FIG. 1 a submarine 20 is equipped with an active sonar system 21 for transmitting acoustic pulses 22 and receiving sonar echoes 23 after the acoustic pulses 22 impinge on a submerged target 24. The target 24 may be stationary, moving, and/or undergoing changes in orientation such that the sonar echoes 23 are Doppler spread. Accordingly, the target 24 can be considered to be a Doppler-spread target.

In accordance with this invention, the submarine additionally includes a classifier system 25 that uses information contained in the reflected sonar echoes 23 for classifying the target 24 into one of a set of predetermined classes. The method of the present invention utilizes the fourth order cumulant information that is described in my U.S. Pat. No. 5,091,890.

This invention is particularly adapted for use with active sonar systems that transmit frequency shift key (FSK) pulses, linear frequency modulation (LFM) and other broadband signals. LFM signals are preferred. However, this invention is more readily understood by analyzing FSK signals characterized by a transmitted wave form $y(i)$ for $i=0$ to $T_\omega$ where $T_\omega$ is the time in seconds before the wave form is repeated. The time duration or length of each sub-pulse is T seconds where $T_p$ is the repetition interval of the sub-pulse. The transmitted wave form $y(i)$ may be written mathematically as:

$$y(i) = \sum_{n=0}^{k} h(i - nT_p)\cos[(\omega_n i + \theta_n)] \quad (1)$$

where $\omega_n$ is the transmitted radiant frequency and $\theta_n$ is the phase of the n-th transmitted sub-pulse. Each sub-pulse $h(i-nT_p)$ may be defined as follows:

$$h(i-\eta T_p) = b_n[u(i-\eta T_p) - u(i-\eta T_p+T)] \quad (2)$$

where "u" is the unit step function and $b_n$, for $n=0,\ldots,k$, indicates the corresponding amplitudes of each sub-pulse. The total pulse length then is given as:

$$T_L = KT_p + T. \quad (3)$$

Accordingly, the Doppler-spread received signal or echo is given by $$z(i) = a\left(i - \frac{T_R}{2}\right)\left[\sum_{n=0}^{k} h(i - nT_p - T_R)\cos(\omega_n + \omega_{nd})(i - T_R) + \theta_n + \phi\right] \quad (4)$$

where $T_R$ is the range to the target 24, $\omega_{nd}$ is the Doppler shift radian frequency associated with each transmitted radian frequency $\omega_n$, $\phi$ is a random phase angle uniformly distributed between 0 and $2\pi$ and $a(i)$ represents a model for Doppler spreading as taught by Van Trees.

In the particular system of U.S. Pat. No. 5,091,890, a match filter 30 in FIG. 2 processes the transmitted signal of Equation (1) and the received signal as represented by Equation (4) to produce in-phase and quadrature components, $Z_c(i)$ and $Z_s(i)$. A fast Fourier transform (FFT) circuit 31, low pass filter (LPF) circuit 32 and inverse fast Fourier transform (IFFT) circuit 33 process the $Z_c(i)$ signals to produce one input to a summing circuit 34. The $Z_s(i)$ vector passes through a fast Fourier transform (FFT) circuit 35, low pass filter (LPF) circuit 36, an inverse fast Fourier transform (IFFT) circuit 37 and a quadrature (j) circuit 38 to form another input to the summing circuit 34.

A circuit 40 converts the sum of the vectors $Z_c(i)$ and $Z_s(i)$ into a target or object fourth order cumulant signal having the form:

$$C_4(j_1, j_2, j_3) = \frac{1}{N}\sum_{i=1}^{N} s(i)s(i+j_1)s^*(i+j_2)s^*(i+j_3) - \quad (5)$$

$$\frac{1}{N}\sum_{i=1}^{N} s(i)s(i+j_1)\frac{1}{N}\sum_{i=1}^{N} s^*(i+j_2)s^*(i+j_3) -$$

$$\frac{1}{N}\sum_{i=1}^{N} s(i)s^*(i+j_2)\frac{1}{N}\sum_{i=1}^{N} s(i+j_1)s^*(i+j_3) -$$

$$\frac{1}{N}\sum_{i=1}^{N} s(i)s^*(i+j_3)\frac{1}{N}\sum_{i=1}^{N} s(i+j_1)s^*(i+j_2)$$

where $s^*$ represents the complex conjugate, and $j_1$ and $j_2$, and $j_3$ are time delays. An object fourth order cumulant spectrum circuit 41 processes the fourth order cumulant according to the following equation $$C_4(\omega_1, \omega_2, \omega_3) = \sum_{j_1=1}^{N}\sum_{j_2=1}^{N}\sum_{j_3=1}^{N} C_4(j_1, j_2, j_3)e^{-jj_1\omega_1}e^{-jj_2\omega_2}e^{-jj_3\omega_3} \quad (6)$$

Each of an object cumulant vector circuit 42 and an object spectrum vector circuit 43 respond to the outputs of the circuits 40 and 41, respectively, to produce a object cumulant vector and an object spectrum vector. In this particular embodiment, both types of vectors are transmitted to a classifier 44. It is also possible to provide classifications using only the fourth order cumulant or the fourth order cumulant spectrum.

The classifier 44 includes a storage area 45 for previously stored class information that have been determined for each of several predetermined classes using fourth order cumulant functions, for example class information based upon both the fourth order cumulant and fourth order cumulant spectrum for each of the predetermined classes. In essence, the classifier 44 compares each of the object vectors with class information in the storage area 45 until the classifier 44 obtains a satisfactory match or determines that a match is not possible. If a match occurs, the object is categorized into the corresponding class. If a match is not possible, the classifier 44 typically waits for a successive echo pulse in an active system or a subsequent sample in a passive system.

Figure 2:
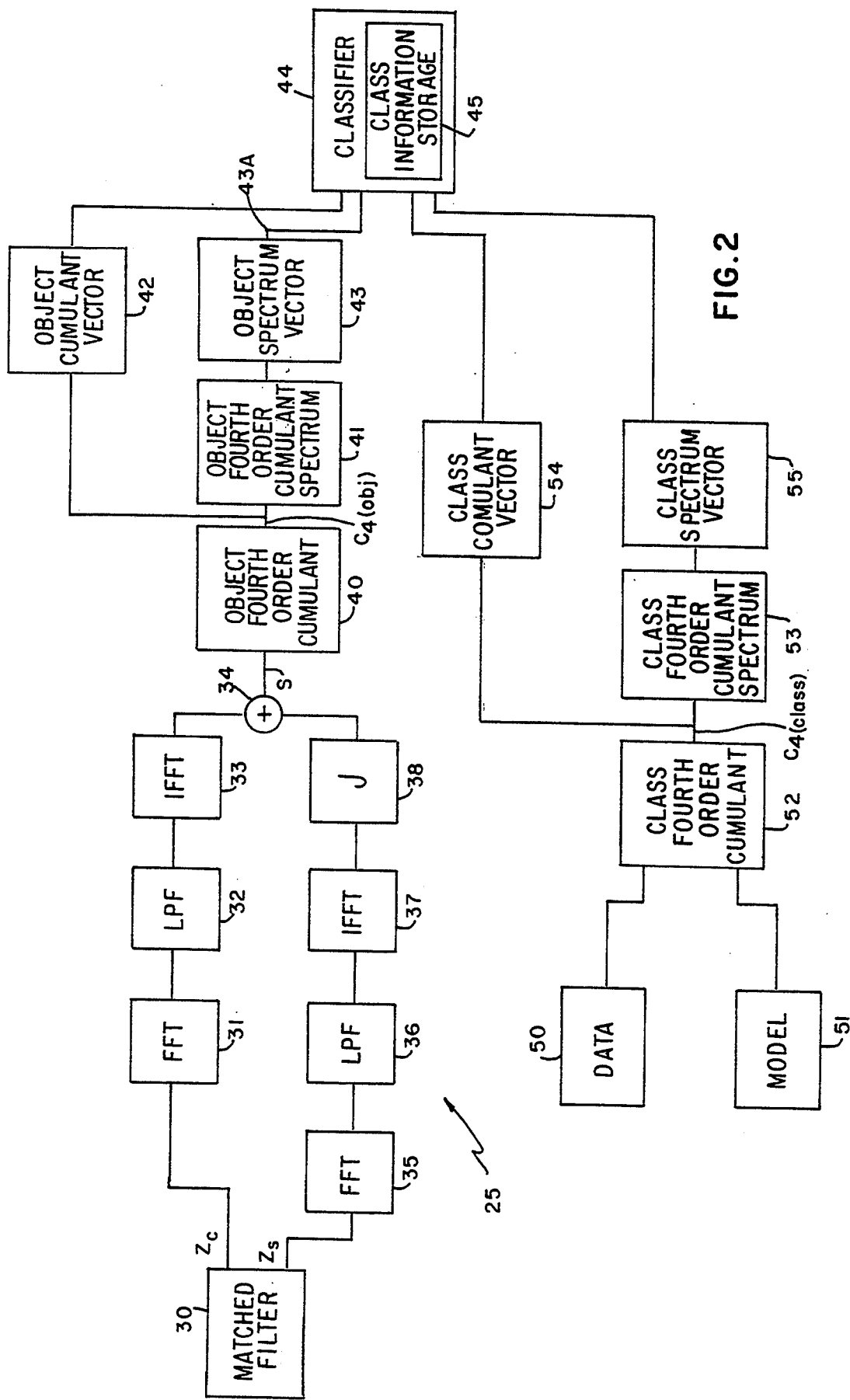
FIG. 2 is a block diagram of apparatus for implementing this invention.

FIG. 2 also depicts the apparatus required for initially loading or subsequently updating the class storage area 45. A data circuit 50, a model circuit 51 or some other source can provide a signal corresponding to the signal from the summing junction 34. A class fourth order cumulant circuit 52 and class fourth order cumulant spectrum circuit 53 produce a $C_{4(class)}$ signal that corresponds to the output signal from the object fourth order cumulant circuit 40 and results by processing the signal in accordance with equation (5). The circuit 53 process that signal in accordance with equation (6). A class cumulant vector circuit 54 and a class spectrum vector circuit 55 produce additional input signals that can be processed for storage in the class information storage 45. Thus, the circuits 50 through 56 provide a means for initially loading or modifying class information in the storage area 45.

Figure 3A:
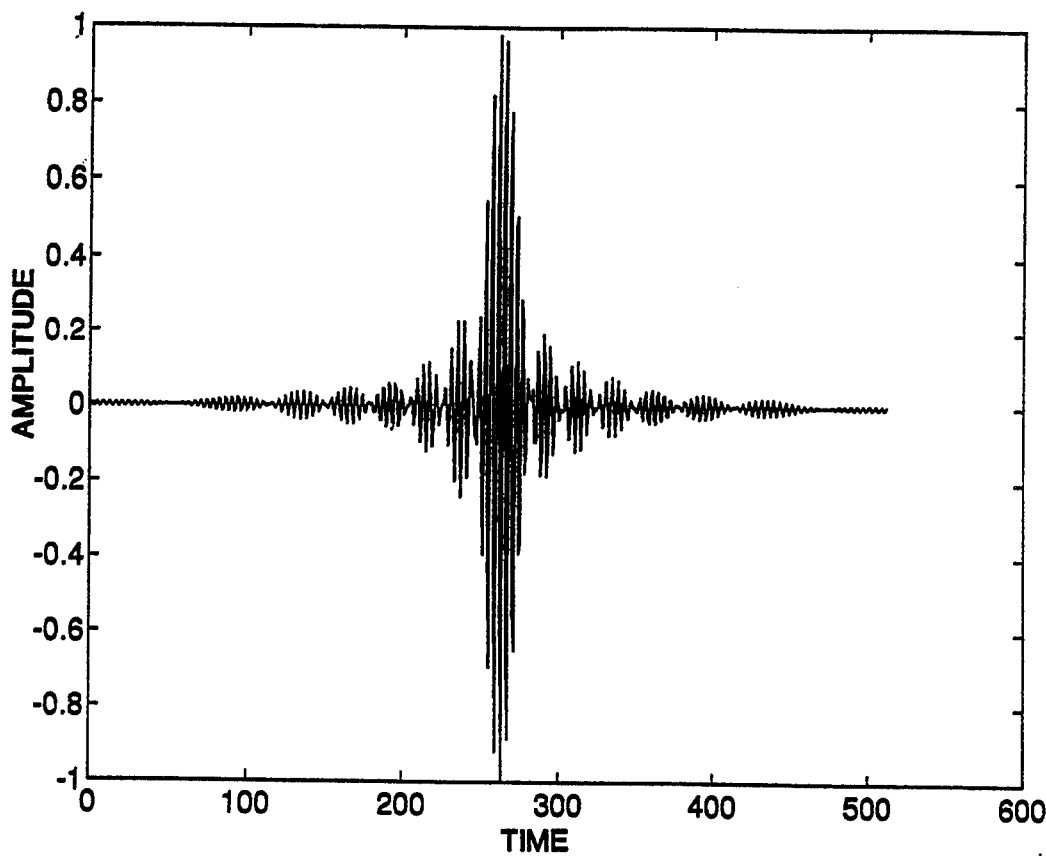
FIG. 3A graphically depicts input data to a portion of the apparatus shown in FIG. 2.
Figure 3B:
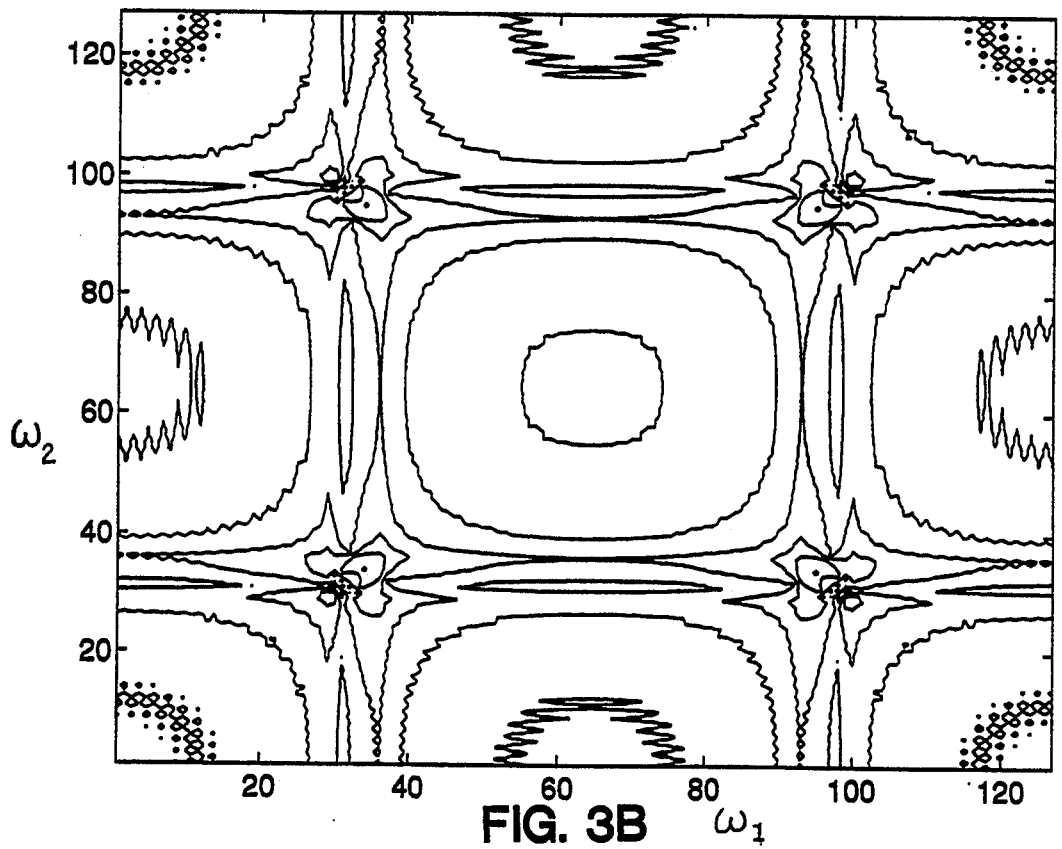
FIG. 3B represents the output from another portion of the circuitry in FIG. 2.

FIG. 3A depicts a typical signal 60 based upon processing a single return echo in an active sonar system in the matched filter circuit 30 of FIG. 2 and remaining circuits through the summing junction 34. FIG. 3A discloses the amplitude of that signal as a function of time and the signal is essentially symetrical about a peak 61. FIG. 3B represents the fourth order cumulant spectrum for the input pulse signal of FIG. 3A as a function of one frequency (i.e., $\omega_2$) and as function of another frequency (i.e., $\omega_1$). Other comparisons can also be utilized in place of or in addition to this particular comparison, such as the fourth order cumulant spectrum frequency $\omega_3$ as a function of $\omega_2$.

Each of the vector circuits 42, 43, 54 and 55 convert signals representing the object and class fourth order cumulants and fourth order cumulant spectra into a corresponding vector. As each operates in an analogous fashion, only the operation of the object fourth order cumulant spectrum vector circuit 43 is discussed in detail.

The image in FIG. 3B can be considered as a 128×128 pixel image for the pulse from a single echo or energy sample with the pixel positions being depicted along the ordinate and abscissa. However, it is a characteristic of the fourth order cumulant and fourth order cumulant spectrum that the corresponding images are symmetrical in two dimensions about a center point. Thus the total information in each quadrant of the image is redundant, so only the information in one quadrant need be analyzed. In this particular example, only the information in the lower left quadrant of FIG. 3B, comprising pixel positions (1,1) through (64,64) is utilized. If $X_{11}(1)$ represents the magnitude, or grey scale, at pixel (1,1) for a first return or sample in sequence, then the image in FIG. 3B can be represented by the following matrix:

$$\begin{pmatrix} X_{1,1}(1) & X_{1,2}(1) & \ldots & X_{1,64}(1) \\ X_{2,1}(1) & X_{2,2}(1) & \ldots & X_{2,64}(1) \\ \vdots & \vdots & & \vdots \\ X_{64,1}(1) & X_{64,2}(1) & \ldots & X_{64,64}(1) \end{pmatrix} \quad (7)$$

Next the object fourth order cumulant spectrum vector circuit 43 converts the matrix into a vector having the following form:

$$X(1) = [X_{1,1}(1), X_{1,2}(1), \ldots, X_{64,64}(1)] \quad (8)$$

where X(1) is the vector for the pulse from a first echo or sample.

The size of any particular vector depends upon the bandwidth of the transmitted waveform, and the number of pixels will differ from the 64×64 pixel quadrant discussed with respect to equation (6). If it is assumed that the maximum pixel position is (M,D) and the circuit 43 produces vectors for "n" returns in succession, then the circuit 43 will produce the following series of vectors on a data path 43A:

$$X(1) = [X_{1,1}(1), X_{1,2}(1), \ldots, X_{M,D}(1)] \quad (9)$$

$$X(2) = [X_{1,1}(2), X_{1,2}(2), \ldots, X_{M,D}(2)] \quad (10)$$

and $$X(\eta) = [X_{1,1}(\eta), X_{1,2}(\eta), \ldots, X_{M,D}(\eta)] \quad (11)$$

Figure 4:
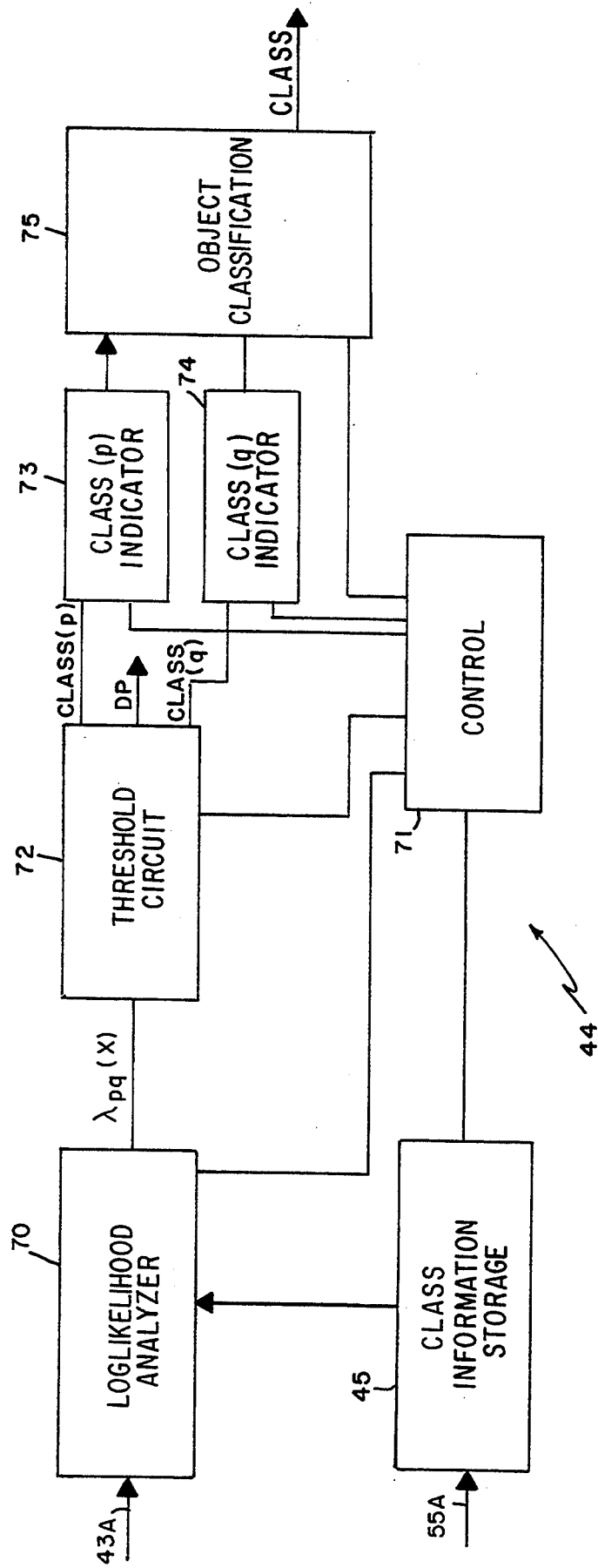
FIG. 4 is a detailed block diagram of the classifier in FIG. 2.

Referring to FIG. 4, the classifier 44 examines each of the incoming object vectors on data path 43A in sequence and attempts to obtain a classification based upon a loglikelihood ratio for the first incoming vector. Loglikelihood ratios are then obtained for each successive incoming vector by processing information from the vector "n" and for immediately preceding vector "n−1" until the classifier is able to categorize the object into one of the classes.

More specifically, it is assumed that there is a finite set of classes into which objects are classified and that a loglikelihood ratio exists for each non-redundant pair of classes. For any arbitrary number of possible classes "P", the number of possible non-redundant pairs of classes is:

$$\frac{P!}{2!(P-2)!} \quad (12)$$

For example, if the finite set comprises four classes, there are six possible non-redundant pairs "pq" of classes where $$pq = [12, 13, 14, 23, 24, 34]. \quad (13)$$

For the first return, the loglikelihood ratio $A_{pq}(X(1))$ for a given redundant pair "pq" is given by:

$$\Lambda_{qp}(X(1)) = \frac{1}{2} \log \left[ \frac{|M_q|}{|M_p|} \right] -$$

$$\frac{1}{2} \{ (X(1) - A_p)^T M_p^{-1} (X(1) - A_p) -$$

$$(X(1)) - A_p)^T M_q^{-1} (X(1) - A_q) \}. \quad (14)$$

For subsequent returns, the loglikelihood ratio for the pair "pq" is:

$$\Lambda_{pq}(X(n)) = \Lambda_{pq}(X(n-1)) + \log \left[ \frac{|N_q|^{1/2} |M_q|^{-1/2}}{|N_p|^{1/2} |M_p|^{-1/2}} \right] - \quad (15)$$

$$\frac{1}{2} \{ (X(n) - A_p)^T C_p^{-1} (X(n) - A_p) - (X(n) - A_q)^T C_q^{-1} (X(n) - A_q) - \\ (X(n) - A_p)^T C_p^{-1} B_p^T (X(n-1) - A_p) + \\ (X(n) - A_q)^T C_q^{-1} B_q^T (X(n-1) - A_q) - \\ (X(n-1) - A_p)^T B_p C_p^{-1} (X(n) - A_p) + \\ (X(n-1) - A_q)^T B_q C_q^{-1} (X(n) - A_q) + \\ (X(n-1) - A_p)^T B_p C_p^{-1} B_p^T (X(n-1) - A_p) \}$$

wherein $A_p$ and $A_q$ are mean vectors for the pair of classes against which the vector is being tested given by $$A_p = E[X(i)|\text{Class}(p)] \quad (16)$$

and $$A_q = E[X(i) | \text{Class}(q)] \tag{17}$$

where X(i) represents an average vector for the class for a pulse i.

$M_p$ and $M_q$ represent the following corresponding covariance matrices $$M_p = E[(X(i) - A_p)^T(X(i) - A_p) | \text{Class}(p)] \tag{18}$$

$$M_q = E[(X(i) - A_q)^T(X(i) - A_q) | \text{Class}(q)] \tag{19}$$

while $M_{p1}$ and $M_{q1}$ represent cross covariance matrices based upon the vector X(i) and the previous vector X(i−1) as follows:

$$M_{p1} = E[(X(i) - A_p)(X(i - 1) - A_p) | \text{Class}(p)] \tag{19}$$

$$M_{q1} = E[(X(i) - A_q)(X(i - 1) - A_q) | \text{Class}(q)].$$

Others of the matrices can be defined as follows:

$$N_p = \begin{pmatrix} M_p & M_{p1} \\ M_{p1} & M_p \end{pmatrix}, \tag{20}$$

$$N_q = \begin{pmatrix} M_q & M_{q1} \\ M_{q1} & M_q \end{pmatrix}, \tag{21}$$

$$B_p = M_p^{-1} M_{p1}, \tag{22}$$
$$B_p^T = M_{p1} M_p^{-1}, \tag{23}$$
$$C_p = M_p - M_{p1} M_p^{-1} M_{p1}, \tag{24}$$
$$C_p^{-1} = M_p^{-1} - M_p^{-1} M_{p1} M_p M_{p1}^{-1}, \tag{25}$$
$$B_q = M_q^{-1} M_{q1}, \tag{26}$$
$$B_q^T = M_{q1} M_q^{-1}, \tag{27}$$
$$C_q = M_q - M_{q1} M_q^{-1} M_{q1} \tag{28}$$
and
$$C_q^{-1} = M_q^{-1} - M_{q1}^{-1} M_q M_{q1}^{-1} \tag{29}$$

wherein the $|M_p|$ and $|M_q|$ are the determinants of the $M_p$ and $M_q$ matrices, respectively.

Figure 5:
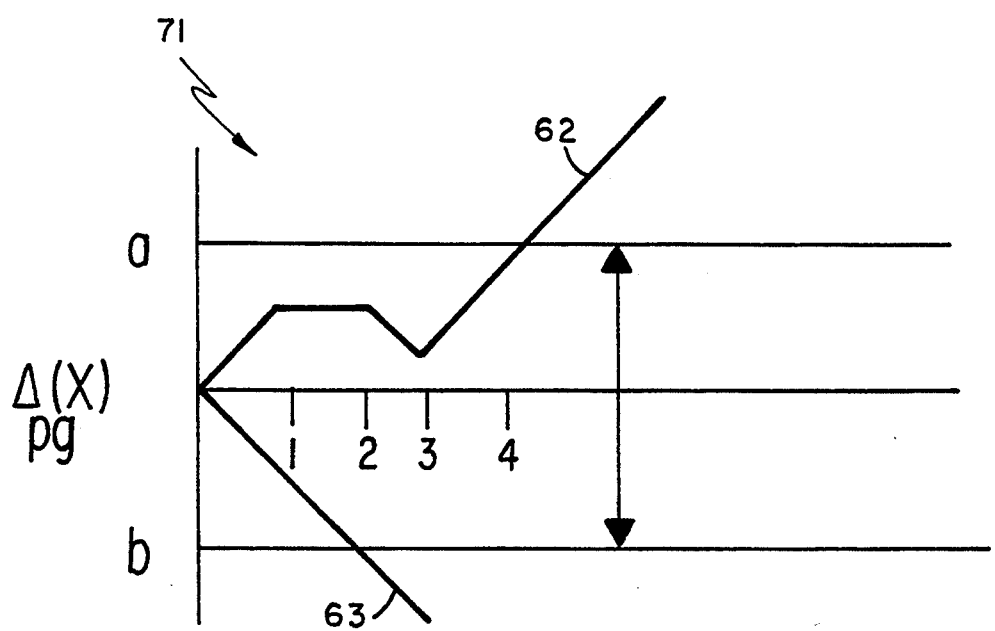
FIG. 5 graphically represents the decision making process in a portion of the classifier shown in FIG. 4.

A loglikelihood analyzer 70 connected to a classifier control circuit 71 processes the signals received over the data path 43A from each of the return pulses or samples according to Equations (14) through (29) using information from the class information storage area 45. Each loglikelihood ratio ($\Lambda_{pq}(X)$ for each pair (pq) is then processed in a threshold circuit 72 that operates as shown in FIG. 5. Basically, the threshold circuit 72 compares each incoming loglikelihood ratio for each pair of classes with thresholds for each corresponding class. The threshold circuit 72 then determines if the signal can be classified into either class "p" or class "q" or whether the signal should not be classified, but be placed in a decision pending (DP) category. FIG. 5 depicts this comparison process in graphical form for several successive returns or samples for a given pair of classes. In actual operation the loglikelihood analyzer 70 and threshold circuit 72 produce multiple outputs for each received pulse by operating in an iterative or parallel fashion. Each iteration produces an output for each non-redundant pair of classes. If there are four possible classes, the analyzer 71 and threshold circuit 72 perform six iterations as the classifier processes each pulse.

If, during any given iteration of any given pulse, a particular loglikelihood ratio $\Lambda_{pq}(X)$ exceeds a threshold level "a", the threshold circuit 72 classifies the pulse in class "p" and updates a class(p) indicator 73. If $\Lambda_{pq}(X)$ exceeds the threshold level "b", the threshold circuit 72 classifies the pulse in class "q" and updates a class(q) indicator 74. If $\Lambda_{pq}(X)$ is between the thresholds "a" and "b", the threshold circuit 72 makes no decision, and establishes the decision pending (DP) state. Stated mathematically, the threshold circuit 72 establishes inputs to class indicators 73 and 74 as follows:

$$\text{IF } \Lambda_{pq}(X(\eta)) \geq a \text{ THEN set class}(p) = \text{class}(p) + 1 \tag{30}$$

$$\text{IF } \Lambda_{pq}(X(\eta)) \leq b \text{ THEN set class}(q) = \text{class}(q) + 1 \tag{31}$$

and $$\text{IF } b < \Lambda_{pq}(X(\eta)) < a \text{ THEN no decision.} \tag{32}$$

As shown in FIG. 5, one set of returns, designated by line 62, does not exceed the "a" threshold until a fourth pulse. Another set of returns, represented by line 63, exceeds the "b" threshold on a second pulse. Consequently, at the end of each pulse, various class indicators 73 and 74 will indicate the number of times that the loglikelihood ratio has exceeded a threshold. An object classification circuit 75 tests each indicator, such as indicators 73 and 74, to determine if the count in that indicator is one less than the total number of possible classes (i.e., (P−1). The logical operation of this circuit is given by:

$$\begin{aligned} &\text{IF class}(1) = (P - 1) \text{ THEN decide class 1} \\ &\text{IF class}(2) = (P - 1) \text{ THEN decide class 2} \\ &\quad \vdots \\ &\text{IF class}(p) = (P - 1) \text{ THEN decide class } p. \end{aligned} \tag{33}$$

If one condition is met, the object classification circuit 75 issues a CLASS signal designating the physcial classification of the object or target 24 in FIG. 1.

Figure 6:
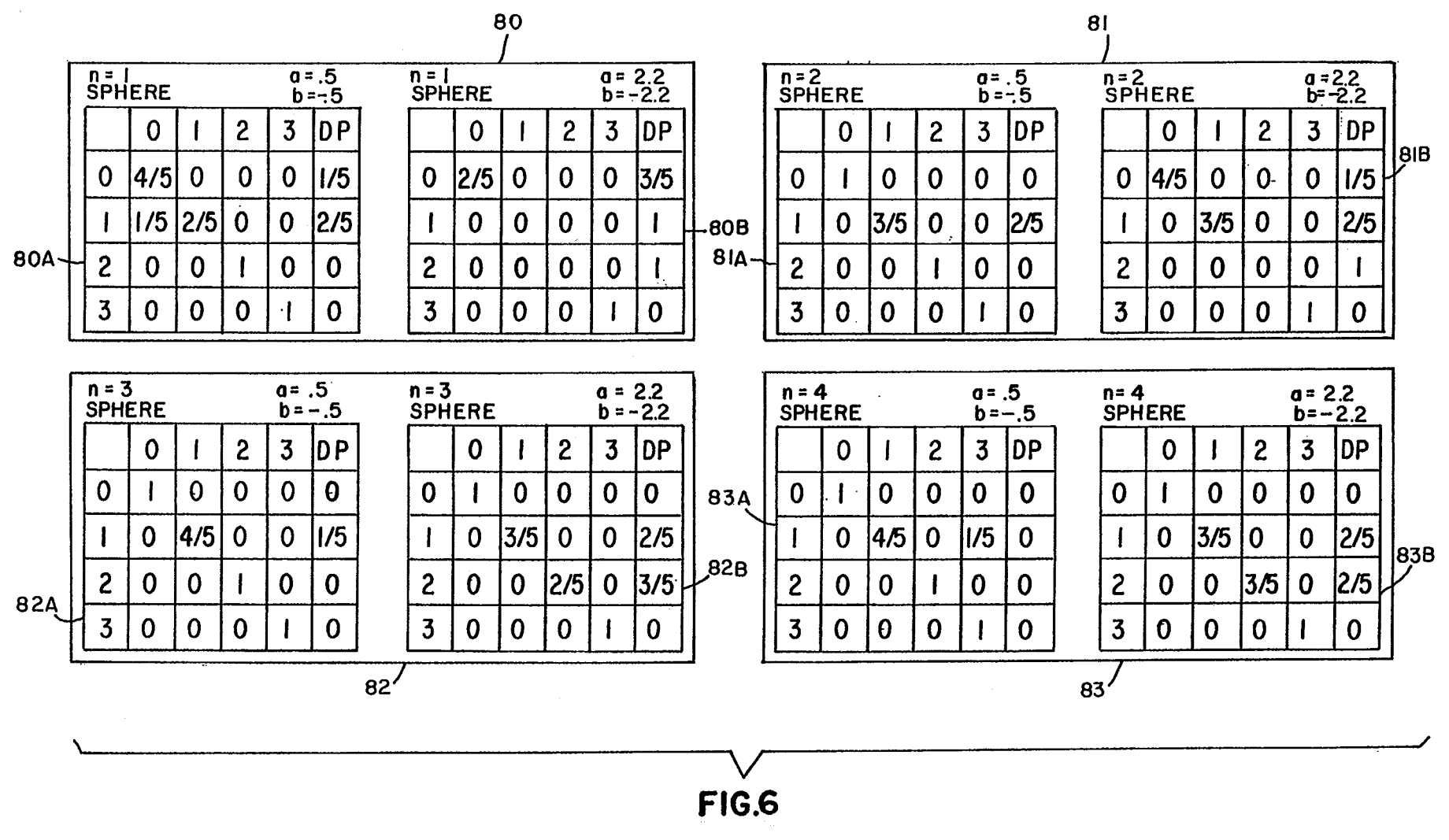

FIG. 6 summarizes the operation of the classifier 44 during the classification of objects into each of four classes representing noise (Class 0), a rigid sphere (Class 1), an elastic steel sphere (Class 2) and an elastic lucite sphere (Class 3). In FIG. 6, each of tables 80, 81, 82 and 83 includes the results for different settings of the threshold values. A left matrix in each table (e.g., matrix 80A in table 80) depicts results when the threshold settings are a=0.5 and b=−0.5. The right matrix in each table (i.e., matrix 80B in table 80) depicts results when the threshold settings are a=2.2 and b=−2.2. Table 80 portrays the classification results in response to the first return pulse from the object in an active sonar system. Tables 81 through 83 represent the results during the second through fourth returns. Moreover, each table represents the data from five successive tests.

Thus the classifier 44 in FIG. 2 classified incoming noise signals as noise (Class 0) when the thresholds were set to a=0.5 and b=−0.5 in 4 out of 5 tests on the basis of data returned during the first pulse of each test sequence as shown in matrix 80A. In one test the classifier 44 produced a "Decision Pending" result. At the same time, a first echo from a rigid sphere was correctly classified in Class 1 in two of the five tests, incorrectly classified in one test, and produced no result in two of the five tests as shown in matrix 80A. CLASS 2 and 3 objects were correctly classified in each of the five tests on the basis of the information received during the first return pulse.

When the thresholds were adjusted to a=2.2 and b=−2.2 as in matrix 80B, the classifier did not misclassify any objects. However, it was unable to classify noise into CLASS 0 during three of the five tests. Moreover, increasing the thresholds made it more difficult to classify the rigid and elastic steel spheres during the five tests.

An examination of the remaining tables in FIG. 5 indicates that the receipt of additional pulses from the various objects tends, generally, to improve any classifications for a given set of thresholds where the first return yields Decision Pending results. Moreover, as might be expected, increasing the thresholds increases the frequency with which decision pending results are obtained for a given pulse. In each table, however, it is evident that the classifier 44 produces accurate classifications for some objects using the fourth order cumulant spectrum information even on the basis of information derived from a first return pulse from an object.

Thus, in accordance with this invention, the apparatus of FIG. 2 provides an accurate classification of unknown objects into predetermined categories or classes by means of fourth order cumulant information obtained from energy received from the unknown object. This apparatus, and its method of operation, provide numerous advantages. Sequentially classifying the objects based upon their differences and data correlation from echo to echo, or from sample to sample in a passive system, through the use of fourth order cumulant information, particularly the fourth order cumulant spectrum, suppresses clutter, noise, and reverberation. The apparatus and method are essentially insensitive to the type of waveform or medium in which the waveform propagates, particularly during the propagation of acoustic energy through sea water. Moreover, the apparatus and method are adapted for different types of classifications for a wide variety of objects.

It will also be apparent that the apparatus and method can be implemented in a wide variety of systems. In some applications, a general purpose computer might connect to a signal source and complete all the necessary signal processing for obtaining the classifications. In other applications, individual modules, corresponding to the discrete circuits shown in FIG. 2, might be combined to produce an operation in accordance with the method of this invention. In still other applications, it may be desirable to utilize special purpose circuits for performing some or all of the various operations of the method of this invention. Finally, although described primarily with respect to classifying objects based upon sonar and radar signals, it will also be apparent that the apparatus and method of this invention can be adapted for medical diagnostic purposes as for analyzing signals from ultrasound, electrocardiogram, electroencephalogram, computed axial tomography and other medical diagnostic apparatus.

Although this invention has been disclosed in terms of certain embodiments, it will be apparent that many modifications can be made to the disclosed apparatus without departing from the invention. Therefore, it is the intent of the appended claims to cover all such variations and modifications as come within the true spirit and scope of this invention.

What is claimed is:

1. Apparatus for cataloging physical objects into one of a plurality of predetermined classes based upon energy received from the object, said apparatus comprising:

means for receiving the energy from the object;

means connected to said receiving means for generating an object vector based upon a fourth order cumulant function for the received energy;

means for storing class information based upon the fourth order cumulant functions for each of the plurality of predetermined classes; and means for classifying the object into one of the predetermined classes based upon the class information.

2. Apparatus as recited in claim 1 wherein said generating means includes means for generating a fourth order cumulant object vector for the received energy and wherein said comparing means compares the fourth order cumulant object vector with the class information based upon fourth order cumulant function information for each class.

3. Apparatus as recited in claim 3 wherein said means for generating the fourth order cumulant object vector operates according to:

$$C_4(j_1, j_2, j_3) = \frac{1}{N} \sum_{i=1}^{N} s(i)s(i+j_1)s^*(i+j_2)s^*(i+j_3) -$$

$$\frac{1}{N} \sum_{i=1}^{N} s(i)s(i+j_1) \frac{1}{N} \sum_{i=1}^{N} s^*(i+j_2)s^*(i+j_3) -$$

$$\frac{1}{N} \sum_{i=1}^{N} s(i)s^*(i+j_2) \frac{1}{N} \sum_{i=1}^{N} s(i+j_1)s^*(i+j_3) -$$

$$\frac{1}{N} \sum_{i=1}^{N} s(i)s^*(i+j_3) \frac{1}{N} \sum_{i=1}^{N} s(i+j_1)s^*(i+j_2)$$

where $s^*$ represents a complex conjugate, and $j_1$ and $j_2$, and $j_3$ are time delays.

4. Apparatus as recited in claim 1 wherein said generating means includes means for generating a fourth order cumulant frequency spectrum object vector and wherein said comparing means compares the fourth order cumulant frequency spectrum object vector with class information based upon the fourth order cumulant frequency spectrum for each class.

5. Apparatus as recited in claim 4 wherein said means for generating the fourth order cumulant frequency spectrum object vector includes:

means for generating a fourth order cumulant object vector according to:

$$C_4(j_1, j_2, j_3) = \frac{1}{N} \sum_{i=1}^{N} s(i)s(i+j_1)s^*(i+j_2)s^*(i+j_3) -$$

$$\frac{1}{N} \sum_{i=1}^{N} s(i)s(i+j_1) \frac{1}{N} \sum_{i=1}^{N} s^*(i+j_2)s^*(i+j_3) -$$

$$\frac{1}{N} \sum_{i=1}^{N} s(i)s^*(i+j_2) \frac{1}{N} \sum_{i=1}^{N} s(i+j_1)s^*(i+j_3) -$$

$$\frac{1}{N} \sum_{i=1}^{N} s(i)s^*(i+j_3) \frac{1}{N} \sum_{i=1}^{N} s(i+j_1)s^*(i+j_2)$$

where $s^*$ represents a complex conjugate, and $j_1$ and $j_2$, and $j_3$ are time delays; and means for generating a fourth order cumulant frequency spectrum object vector X(1) according to:

$$C_4(\omega_1, \omega_2, \omega_3) = \sum_{j_1=1}^{N} \sum_{j_2=1}^{N} \sum_{j_3=1}^{N} C_4(j_1, j_2, j_3) e^{-jj_1\omega_1} e^{-jj_2\omega_2} e^{-jj_3\omega_3}.$$

6. Apparatus as recited in claim 1 wherein the energy from the object is received as a succession of energy pulses, wherein said generating means produces an object vector for each energy pulse and wherein said classifying means analyzes the object vectors in sequence.

7. Apparatus as recited in claim 6 wherein said classifying means includes decision means for classifying each energy pulse by means of a loglikelihood ratio using the object vector and corresponding information from said storing means for each of two of the plurality of predetermined classes.

8. Apparatus as recited in claim 6 wherein said classifying means includes decision means for classifying each energy pulse by means of a loglikelihood ratio using the object vector and, in sequence, corresponding information from said storing means for each possible pair of the plurality of predetermined classes.

9. Apparatus as recited in claim 8 wherein said decision means includes means for establishing, for each pair of classes, a pair of thresholds that determine whether each energy pulse is classified into one of the pair of classes or is unclassified.

10. Apparatus for classifying a physical object located in a medium into one of a predetermined number of classes, said apparatus comprising:
means for transmitting at least one energy pulse toward the object;
means for receiving an echo from the object in response to a transmitted energy pulse;
means connected to said receiving means for processing each received echo to obtain a fourth order cumulant frequency spectrum vector corresponding to the received echo;
means for storing information for each of the predetermined number of classes based upon the fourth order cumulant frequency spectrum for each predetermined class;
means connected to said processing means and said storing means for classifying each energy pulse into one of three states; and
means connected to said pulse classifying means for producing the classification for each object based upon echoes from the object.

11. Apparatus as recited in claim 10 wherein said processing means includes a fourth order cumulant generator, a fourth order cumulant frequency spectrum generator and means for converting the fourth order cumulant frequency spectrum to as fourth order cumulant frequency spectrum vector for each echo.

12. Apparatus as recited in claim 10 wherein said processing means includes:
a fourth order cumulant generator for producing a fourth order cumulant signal, $\Lambda_{pq}(X(n))$, for each pulse "n" according to:

$$C_4(j_1, j_2, j_3) = \frac{1}{N} \sum_{i=1}^{N} s(i)s(i+j_1)s^*(i+j_2)s^*(i+j_3) -$$

$$\frac{1}{N} \sum_{i=1}^{N} s(i)s(i+j_1) \frac{1}{N} \sum_{i=1}^{N} s^*(i+j_2)s^*(i+j_3) -$$

$$\frac{1}{N} \sum_{i=1}^{N} s(i)s(i+j_2) \frac{1}{N} \sum_{i=1}^{N} s^*(i+j_1)s^*(i+j_3) -$$

$$\frac{1}{N} \sum_{i=1}^{N} s(i)s(i+j_3) \frac{1}{N} \sum_{i=1}^{N} s^*(i+j_1)s^*(i+j_2)$$

a fourth order cumulant frequency spectrum generator for producing a fourth order cumulant frequency spectrum signal for each pulse according to:

$$C_4(\omega_1, \omega_2, \omega_3) = \sum_{j_1=1}^{N} \sum_{j_2=1}^{N} \sum_{j_3=1}^{N} C_4(j_1, j_2, j_3) e^{jj_1\omega_1} e^{jj_2\omega_2} e^{jj_3\omega_3}; \text{ and}$$

a vector generator for converting the fourth order cumulant frequency spectrum signal into a vector having the form:

$$X(1) = [X_{1,1}(1), X_{1,2}(1), \ldots, X_{64,64}(1)].$$

13. Apparatus as recited in claim 10 wherein said pulse classifying means includes:
loglikelihood ratio generating means connected to said vector generating means and said storing means for generating a loglikelihood ratio for each vector with respect to a pair of classes;
threshold means for determining whether each energy pulse is to be classified into one or none of the classes in the pair; and
means for recording the classification of a pulse into one of a pair of classes.

14. Apparatus as recited in claim 13 wherein said storing means stores information for "class(p)" and "class(q)" classes in one pair of classes including $A_p$ and $A_q$ mean vectors for a given echo pulse and covariance matrices $M_p$ and $M_q$ that depend upon a given vector for an echo and a corresponding means vector and wherein said loglikelihood ratio generating means produces a loglikelihood ratio signal $\Lambda_{pq}(X(1))$ for a first pulse according to:

$$\Lambda_{pq}(X(1)) = \frac{1}{2} \log \left[ \frac{|M_q|}{|M_p|} \right] -$$
$$\frac{1}{2} \{(X(1) - A_p)^T M_p^{-1}(X(1) - A_p) -$$
$$(X(1) - A_q)^T M_q^{-1}(X(1) - A_q)\}.$$

15. Apparatus as recited in claim 14 wherein said loglikelihood ratio generating means produces a loglikelihood ratio, $\Lambda_{pq}(X(1))$, for a successive pulse "n" according to:

$$\Lambda_{pq}(X(n)) = \Lambda_{pq}(X(n-1)) + \log \left[ \frac{|N_q|^{1/2} |M_q|^{-1/2}}{|N_p|^{1/2} |M_p|^{-1/2}} \right] - \quad (15)$$

$$\frac{1}{2} \{(X(n) - A_p)^T C_p^{-1}(X(n) - A_p) - (X(n) -$$
$$A_q)^T C_q^{-1}(X(n) - A_q) -$$
$$(X(n) - A_p)^T C_p^{-1} B_p^T(X(n-1) - A_p) +$$
$$(X(n) - A_q)^T C_q^{-1} B_q^T(X(n-1) - A_q) -$$
$$(X(n-1) - A_p)^T B_p C_p^{-1}(X(n) - A_p) +$$
$$(X(n-1) - A_q)^T B_q C_q^{-1}(X(n) - A_q) +$$
$$(X(n-1) - A_p)^T B_p C_p^{-1} B_p^T(X(n-1) - A_p)\}$$

where $N_p$, $N_q$, $C_p$, $C_q$, $B_p$ and $B_q$ are cross covariances in said storing means based upon the covariance matrices.

16. Apparatus as recited in claim 13 wherein said threshold means establishes, for a given pair of classes, first and second thresholds and enables said recording means to record a classification when the loglikelihood ratio exceeds one of the two thresholds, said loglikelihood ratio generating means and said threshold means providing an analysis of each echo for each possible pair of classes.

17. Apparatus as recited in claim 16 wherein said loglikelihood ratio generating means generates a $\Lambda_{pq}$ signal for a given pair, "p" and "q", of classes and said threshold means operates according to:

IF $\Lambda_{pq}(X(\eta)) \geq a$ THEN set class(p)=class(p)+1 and

IF $\Lambda_{pq}(X(\eta)) \leq b$ THEN set class(q)=class(q)+1 where "a" and "b" are the thresholds for classes "p" and "q" respectively and said recording means includes a class(p) recording means and a class(q) recording means for being incremented when $\Lambda_{pq}$ exceeds "a" and "b" respectively.

18. A method for classifying an object located in a medium into one of a plurality of classes comprising the steps of receiving one of a plurality of energy samples from the object through the medium and for each sample, in succession:
   generating a fourth order cumulant vector corresponding to an energy sample;
   comparing the fourth order cumulant vector with class information derived from the fourth order cumulant information for each of the classes taken two at a time;
   testing the result of each comparison for each nonredundant pair of classes to determine pulse classification; and
   accumulating the testing results for each of the energy samples to classify the object.

19. A method as recited in claim 18 wherein said step for generating a fourth order cumulant vector includes:
   generating a fourth order cumulant object vector according to:

$$C_4(j_1, j_2, j_3) = \frac{1}{N} \sum_{i=1}^{N} s(i)s(i+j_1)s^*(i+j_2)s^*(i+j_3) -$$

$$\frac{1}{N} \sum_{i=1}^{N} s(i)s(i+j_1) \frac{1}{N} \sum_{i=1}^{N} s^*(i+j_2)s^*(i+j_3) -$$

$$\frac{1}{N} \sum_{i=1}^{N} s(i)s^*(i+j_2) \frac{1}{N} \sum_{i=1}^{N} s(i+j_1)s^*(i+j_3) -$$

$$\frac{1}{N} \sum_{i=1}^{N} s(i)s^*(i+j_3) \frac{1}{N} \sum_{i=1}^{N} s(i+j_1)s^*(i+j_2)$$

where s* represents a complex conjugate, and $j_1$ and $j_2$, and $j_3$ are time delays;
   generating a fourth order cumulant frequency spectrum object vector according to:

$$C_4(\omega_1, \omega_2, \omega_3) = \sum_{j_1=1}^{N} \sum_{j_2=1}^{N} \sum_{j_3=1}^{N} C_4(j_1, j_2, j_3) e^{-jj_1\omega_1} e^{-jj_2\omega_2} e^{-jj_3\omega_3}$$

and
   converting the fourth order cumulant frequency spectrum signal into a vector X(1) having the form:

$$X(1) = [X_{1,1}(1), X_{1,2}(1), \ldots, X_{64,64}(1)].$$

20. A method as recited in claim 18 wherein the class information derived from the fourth order cumulant information includes "class(p)" and "class(q)" information for each class in a pair of classes including $A_p$ and $A_q$ mean vectors and covariance matrices $M_p$ and $M_q$ that depend upon information for each predetermined class of objects and wherein the step of comparing the fourth order cumulant vector with the class information includes the step of obtaining a loglikelihood ratio $\Lambda_{pq}(X(1))$ for a first pulse according to:

$$\Lambda_{pq}(X(1)) = \frac{1}{2} \log\left[\frac{|M_q|}{|M_p|}\right] -$$
$$\frac{1}{2} \{(X(1) - A_p)^T M_p^{-1}(X(1) - A_p) -$$
$$(X(1) - A_q)^T M_q^{-1}(X(1) - A_q)\}.$$

21. A method as recited in claim 18 wherein the step of obtaining a loglikelihood ratio includes the step of obtaining a loglikelihood ratio, $\Lambda_{pq}(X(n))$, for a successive pulse "n" according to:

$$\Lambda_{pq}(X(n)) = \Lambda_{pq}(X(n-1)) + \log\left[\frac{|N_q|^{1/2}|M_q|^{-1/2}}{|N_p|^{1/2}|M_p|^{-1/2}}\right] - \tag{15}$$

$$\frac{1}{2}\{(X(n) - A_p)^T C_p^{-1}(X(n) - A_p) - (X(n) -$$
$$A_q)^T C_q^{-1}(X(n) - A_q) -$$
$$(X(n) - A_p)^T C_p^{-1} B_p^T(X(n-1) - A_p) +$$
$$(X(n) - A_q)^T C_q^{-1} B_q^T(X(n-1) - A_q) -$$
$$(X(n-1) - A_p)^T B_p C_p^{-1}(X(n) - A_p) +$$
$$(X(n-1) - A_q)^T B_q C_q^{-1}(X(n) - A_q) +$$
$$(X(n-1) - A_p)^T B_p C_p^{-1} B_p^T(X(n-1) - A_p)\}$$

where $N_p$, $N_q$, $C_p$, $C_q$, $B_p$ and $B_q$ are stored cross covariances based upon the covariance matrices.

22. A method as recited in claim 18 wherein said testing step includes:
   comparing each $\Lambda_{pq}$ loglikelihood signal for a given pair, "p" and "q", of classes with thresholds "a" and "b" for classes "p" and "q" respectively according to:

IF $\Lambda_{pq}(X(\eta)) \geq a$ THEN set class(p)=class(p)+1 and

IF $\Lambda_{pq}(X(\eta)) \leq b$ THEN set class(q)=class(q)+1 and incrementing class(p) and class(q) recording means each time $\Lambda_{pq}$ exceeds "a" and "b" respectively.

* * * * *